UNITED STATES PATENT OFFICE.

LOUIS RABINOVITZ, OF MONTCLAIR, NEW JERSEY, ASSIGNOR TO ELLIS-FOSTER COMPANY, A CORPORATION OF NEW JERSEY.

PROCESS OF REGULATING THE OXIDATION OF AMMONIA.

1,304,707. Specification of Letters Patent. Patented May 27, 1919.

No Drawing. Application filed March 10, 1917. Serial No. 153,855.

*To all whom it may concern:*

Be it known that I, LOUIS RABINOVITZ, a citizen of the United States, residing at Montclair, in the county of Essex and State of New Jersey, have invented certain new and useful Improvements in Processes of Regulating the Oxidation of Ammonia, of which the following is a specification.

This invention relates to a process of oxidizing ammonia, directed particularly to the production of nitric acid or corresponding oxids of nitrogen, and has to do especially with the exposure of a mixture of ammonia and air or other oxygen-containing gas containing oxygen in excess, to a heated catalytic substance capable of bringing about the oxidation of the ammonia so as to enable the ready production of nitric acid.

When ammonia and air are exposed to catalytic material such as for example, platinum, a number of oxidation phenomena are noted, one of which is the formation of nitrogen, which is an objectionable reaction since little or none of the nitrogen thus liberated is oxidized to nitrous or nitric oxid and hence the formation of free nitrogen represents a loss in ammonia.

In order to bring about the oxidation of ammonia to produce nitric acid on a basis comparative in commercial terms with Chile saltpeter, it becomes necessary to secure well over a 90% conversion of the ammonia, which is not possible under ordinary conditions employing the usual platinum catalytic material. As low as 75% or 80% conversion is not infrequent under normal conditions.

One reason for this oxidation appears to be too great concentration of oxygen and by the present process this condition is obviated or at least minimized by the introduction into the gaseous mixture passing to the catalyzer of a quantity of an inert gas or a gas of substantially an inactive character which tends to dilute the oxygen, preventing its too vigorous action. The greater part of the deleterious oxidation of ammonia appears to occur in the initial portion of the catalytic reaction and in the present case the addition of such relatively inactive or entirely inert gases enables the movement of the gas current into the catalytic bed to take place under conditions which preclude violent oxidation of a highly destructive character. Such gases as have been referred to include nitrogen and carbon dioxid or mixtures of these, or even in some cases, water vapor alone or admixed with the foregoing gases may be added at the start in considerable quantity to effect the necessary dilution. I prefer, however, to use a nitrogen-containing gas and particularly the nitrogen enriched products of the oxidation of ammonia. That is to say, if a mixture of ammonia and air is passed through catalytic material and nitrous oxids are removed by suitable absorption or recovery means, the residual gases may be used directly as a diluent, or may if desired, first be dried. These mixed gases, that is, the gas mixture depleted of oxids of nitrogen, are added to the entering ammonia and air mixture in proportion to enrich the mixture preferably at least several per cent. of nitrogen, and in many cases also adding a suitable amount of moisture, thereby diluting the ammonia and oxygen to an extent such that the violent destructive oxidation referred to, is under better control.

Thus, apparatus adapted for my process may consist of an oxidation chamber containing the catalyst and means for producing a mixture of ammonia, air and products of ammonia oxidation, preferably free from acid bodies. The products of ammonia oxidation may be pumped back from the exit of the nitric acid absorber to be mingled with the mixture of air and ammonia entering the catalytic chamber. By suitable valves the proportions of the three gas components may be suitably regulated, so as to secure varying amounts of nitrogen, according to the activity of the catalyzer. When the catalytic material is fresh and highly active, a greater amount of nitrogen may be added than during the latter stages of use of such catalytic material. The nitrogen addition may thus vary from 2 or 3% to 10% or even considerably more, depending on the precise conditions of operation. Carbon dioxid may be used in a similar manner or carbonate of ammonia may be used in lieu thereof. In fact carbonate of ammonia may replace the ammonia entirely.

In using the expressions "enriching the mixture with nitrogen" or "percentage addition of nitrogen", it should be understood that thereby is meant the dilution of the air and ammonia mixture passing to the catalyzer by the addition to such mixture of nitrogen or of nitrogen-containing gases, having a higher content of nitrogen than is present in normal air. For example, a mixture of gases consisting of ammonia, oxygen and nitrogen may be employed in which the nitrogen content may be 75-80%.

What I claim is:—

1. In the process of catalytically oxidizing ammonia, the step which comprises adding to the mixture of ammonia and air passing to the catalytic chamber a quantity of mixed gases containing a greater quantity of nitrogen than that contained in air.

2. In the catalytic oxidation of ammonia to produce nitrous compounds the step which comprises diluting the mixture of ammonia and air passing to the catalytic chamber with a mixture of gases containing less than 21% of an oxidizing gas.

LOUIS RABINOVITZ.